(12) United States Patent
Miller et al.

(10) Patent No.: US 11,441,983 B2
(45) Date of Patent: Sep. 13, 2022

(54) SYSTEMS AND METHODS FOR OPTIMIZING DROP TEST CONFIGURATIONS

(71) Applicant: UATC, LLC, San Francisco, CA (US)

(72) Inventors: Jonathan Miller, Glenshaw, PA (US); Paul Kevin Smith, McCandless Twp, PA (US); Mark Vincent Brancale, Ridgewood, NJ (US)

(73) Assignee: UATC, LLC, Mountain View, CA (US)

( * ) Notice: Subject to any disclaimer, the term of this patent is extended or adjusted under 35 U.S.C. 154(b) by 192 days.

(21) Appl. No.: 16/991,494

(22) Filed: Aug. 12, 2020

(65) Prior Publication Data

US 2022/0003647 A1  Jan. 6, 2022

Related U.S. Application Data

(60) Provisional application No. 63/047,060, filed on Jul. 1, 2020.

(51) Int. Cl.
*G01M 7/08* (2006.01)
*G01N 3/303* (2006.01)

(52) U.S. Cl.
CPC .............. *G01N 3/303* (2013.01); *G01M 7/08* (2013.01)

(58) Field of Classification Search
None
See application file for complete search history.

(56) References Cited

U.S. PATENT DOCUMENTS

| 3,226,974 A | * | 1/1966 | Bresk | G01N 3/303 |
| | | | | 73/12.06 |
| 3,402,593 A | * | 9/1968 | Bresk | G01N 3/303 |
| | | | | 73/12.06 |
| 3,577,763 A | * | 5/1971 | Beal | G01N 3/303 |
| | | | | 73/12.06 |
| 6,327,921 B1 | * | 12/2001 | Hsu | G01N 29/0645 |
| | | | | 73/866.5 |

FOREIGN PATENT DOCUMENTS

JP  2012127927 A  *  7/2012  ............. G01N 3/303

OTHER PUBLICATIONS

Title: "Design for Standard Impact Pulses of Drop Tester"; URL: https://ieeexplore.ieee.org/stamp/stamp.jsp?tp=&arnumber=1396717 (Year: 2004).*

* cited by examiner

Primary Examiner — Manish S Shah
Assistant Examiner — Ruben C Parco, Jr.
(74) Attorney, Agent, or Firm — Dority & Manning, P.A.

(57) ABSTRACT

In one aspect, a method for conducting a drop test of an article with one or more target parameters can include dropping the article and a drop carriage of a drop tower from an initial height with respect to a base of the drop tower for an initial drop test. The article can be coupled to the drop carriage. The method can include detecting accelerometer data with respect to the article for an initial impact between the drop carriage and the base of the drop tower; determining a constant energy balance curve; determining, based on the constant energy balance curve and a target pulse duration, a target complex stiffness and/or a target total weight; adjusting, based on the target complex stiffness or the target total weight, the complex stiffness and/or the total weight for a subsequent drop test; and conducting the subsequent drop test.

8 Claims, 11 Drawing Sheets

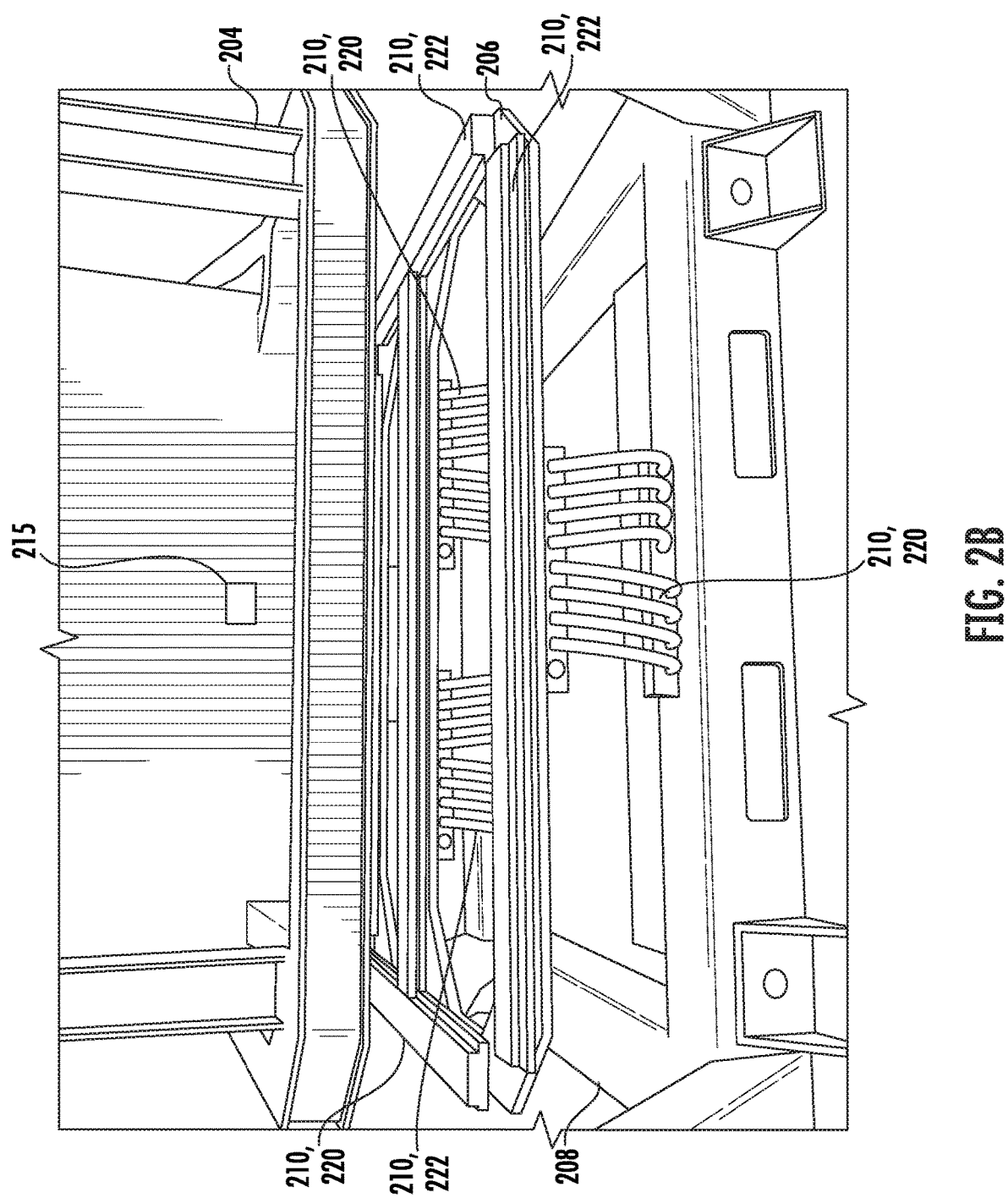

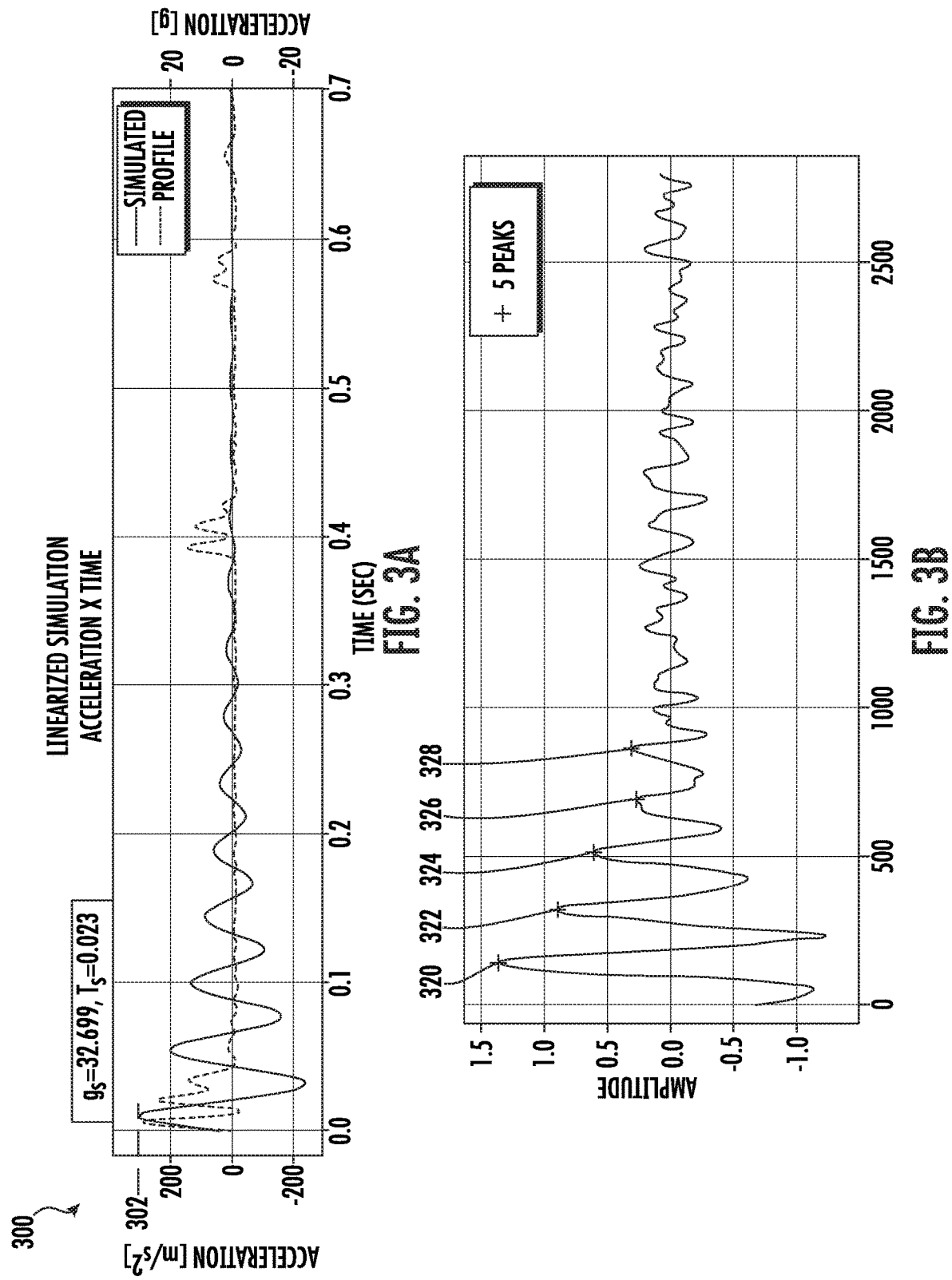

PROFILE TITLE* — 402
COMBINED MASS (kg) — 404
SPRING RATE (N/m)* — 408
DAMPING COEFFICIENT (kg/s)* — 410
OF SPRING SYSTEMS (SERIES) — 412
HEIGHT (ft) — 414
CONFIGURATION DESCRIPTION * — 416
IMAGE OF CONFIGURATION — 418
TRIMMED .csv OF MEASURED SHOCK 406 brackets: 404, 408, 410, 412

Fields shown:
- [CONFIGURATION NAME]
- 219.9
- 36523522
- 5421
- 1
- 4.00
- THIS IS THE 6 COIL CONFIGURATION WITH THREE STACKED ELASTOMER PADS
- UPLOAD (0)
- UPLOAD (0)

502:
- COMBINED MASS (kg): 219.9
- TARGET AMPLITUDE (g): 50
- TARGET PULSE WIDTH (s): 0.025
- TOLERANCE (DECIMAL): 0.005

| NAME | SPRING RATE (N/m) | DAMPING COEFFICIENT (kg/) | DROP HEIGHT (ft) | PULSE WIDTH (s) | MATCHES TARGET? | DAMPING STATUS |
|---|---|---|---|---|---|---|
| [CONFIG. 1] | 3181304.1365 | 5279.1883 | 7.108 | 0.026 | POSSIBLE | UNDERDAMPED : 0.100 |
| [CONFIG. 2] | 4259568.0626 | 4167.3894 | 5.309 | 0.023 | POSSIBLE | UNDERDAMPED : 0.068 |
| [CONFIG. 3] | 4259568.0626 | 4167.3894 | 5.309 | 0.023 | POSSIBLE | UNDERDAMPED : 0.068 |
| [CONFIG. 4] | 4503844.3147 | 4156.2055 | 5.021 | 0.022 | POSSIBLE | UNDERDAMPED : 0.066 |
| [CONFIG. 5] | 112523523 | 5000 | 0.201 | 0.004 | FAIL: NEED SOFTER SPRINGS | UNDERDAMPED : 0.016 |
| [CONFIG. 6] | 10000000 | 5000 | 2.261 | 0.015 | FAIL: NEED SOFTER SPRINGS | UNDERDAMPED : 0.053 |

FIG. 5

SYSTEMS AND METHODS FOR OPTIMIZING DROP TEST CONFIGURATIONS

CROSS-REFERENCE TO RELATED APPLICATION

The present application claims filing benefit of U.S. Provisional Patent Application Ser. No. 63/047,060 having a filing date of Jul. 1, 2020, which is incorporated herein by reference in its entirety.

FIELD

The present disclosure relates generally to vehicle networks for autonomous vehicles. More particularly, the present disclosure relates to systems and methods for optimizing drop test configurations.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or can be learned from the description, or can be learned through practice of the embodiments.

Aspects of the present disclosure are directed to a method for conducting a drop test of an article with one or more target parameters can include dropping the article and a drop carriage of a drop tower from an initial height with respect to a base of the drop tower for an initial drop test, wherein the article is coupled to the drop carriage. The method can include detecting accelerometer data with respect to the article for an initial impact of the initial drop test between the drop carriage and the base of the drop tower. The method can include determining a constant energy balance curve for at least one of a complex stiffness or a total weight of the article and the drop carriage with respect to a pulse duration of the initial impact, the complex stiffness being for at least one of the drop carriage or the base of the drop tower. The method can include determining, based on the constant energy balance curve and a target pulse duration, at least one of a target complex stiffness or a target total weight for the article and the drop carriage. The method can include adjusting, based on the target complex stiffness or the target total weight, the at least one of the complex stiffness or the total weight for a subsequent drop test. The method can include conducting the subsequent drop test after adjusting the at least one of the complex stiffness or the total weight for the subsequent drop test.

Another aspect of the present disclosure is directed to a system for conducting a drop test of an article with one or more target parameters can include a drop assembly comprising a drop tower and a drop carriage, the drop tower comprising a base. The article can be coupled to the drop carriage. The system can include one or more processors and one or more non-transitory computer-readable media that collectively store instructions that, when executed by the one or more processors, cause the one or more processors to perform operations. The operations can include detecting first accelerometer data with respect to the article for an initial impact of an initial drop test between the drop carriage and the base of the drop tower when the drop carriage and article are dropped from an initial height with respect to the base of the drop tower for an initial drop test. The operations can include determining a constant energy balance curve for at least one of a complex stiffness or a total weight of the article and the drop carriage with respect to a pulse duration of the initial impact. The complex stiffness can be for at least one of the drop carriage or the base of the drop tower. The method can include determining at least one of a target complex stiffness or a target total weight for the article and the drop carriage based on the constant energy balance curve, the first accelerometer data, and a target pulse duration. The method can include detecting second accelerometer data with respect to the article for a subsequent drop test between the drop carriage and the base of the drop tower with the at least one of the target complex stiffness or the target total weight for the article and the drop carriage.

Another aspect of the present disclosure is directed to a computer-implemented method for conducting a drop test of an article with one or more target parameters. The method can include detecting, by one or more computing devices, first accelerometer data with respect to an article for an initial impact of an initial drop test between a drop carriage and a base of a drop tower when the drop carriage and article are dropped from an initial height with respect to the base of the drop tower for an initial drop test; automatically determining, by the one or more computing devices and in response to detecting the first accelerometer data, a constant energy balance curve for at least one of a complex stiffness or a total weight of the article and the drop carriage with respect to a pulse duration of the initial impact, the complex stiffness being for at least one of the drop carriage or the base of the drop tower; and automatically determining, by the one or more computing devices at least one of a target complex stiffness or a target total weight for the article and the drop carriage based on the constant energy balance curve, the first accelerometer data, and a target pulse duration Other aspects of the present disclosure are directed to various systems, apparatuses, non-transitory computer-readable media, user interfaces, and electronic devices.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2B is an enlarged perspective view of the platform, resilient members, and base of the drop tower.

FIG. 3A depicts a chart of simulated and detected accelerometer data for an initial drop test according to aspects of the present disclosure.

FIG. 3B illustrates example collected accelerometer data for a drop test according to aspects of the present disclosure.

FIG. 4 illustrates an example user interface for receiving user input of a testing computer system, for example corresponding to the testing computer system of FIG. 1.

FIG. 5 illustrates another example user interface of the testing computing system.

DETAILED DESCRIPTION

Figure 1:
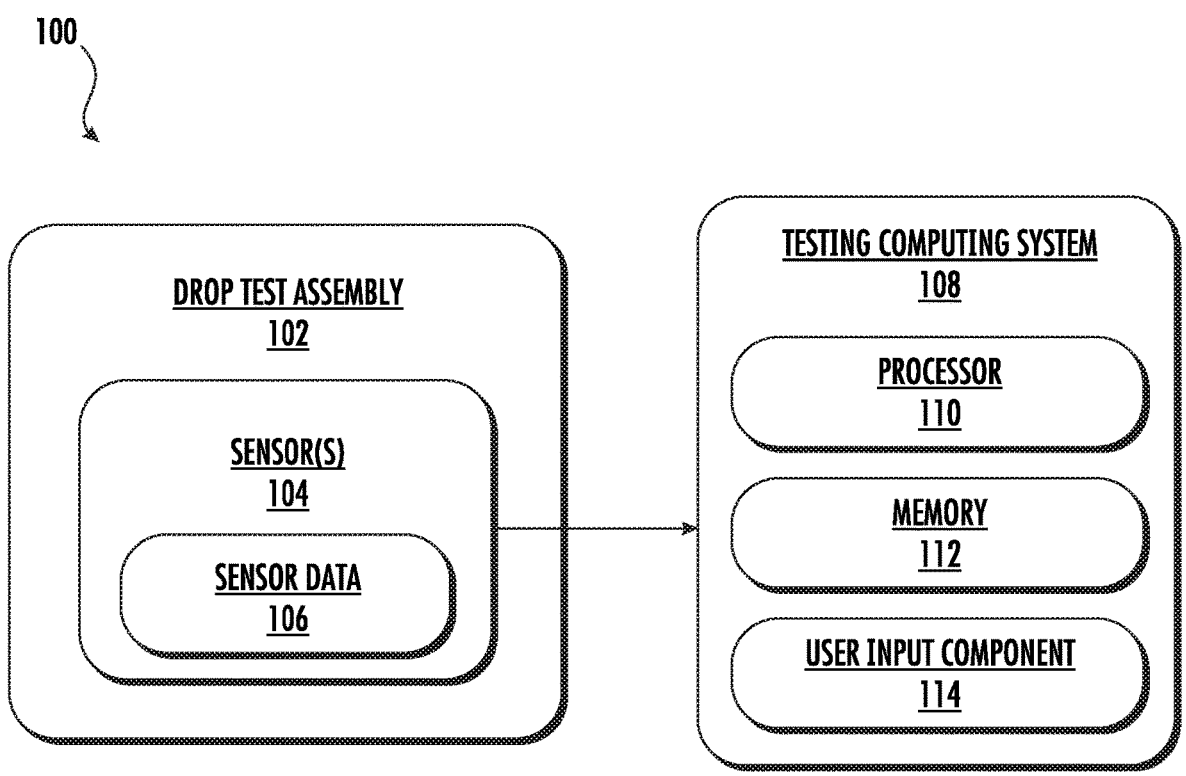
FIG. 1 depicts an example system overview according to example implementations of the present disclosure.

Generally, the present disclosure is directed to systems and methods for optimizing drop test configurations. Drop tests can be used to subject a test article to an impact to collect data with respect to the test article, such as strength, reliability, etc. of the test article. The present method can reduce the number of drop tests needed to achieve a drop test having a desired set of characteristics. For example, target characteristics can include a pulse duration, peak acceleration, energy dissipated, and the like.

According to one aspect of the present disclosure, a method for conducting a drop test of an article with one or more target parameters can include dropping the article and a drop carriage of a drop tower from an initial height with respect to a base of the drop tower for an initial drop test. The article can be coupled to the drop carriage. Accelerometer data can be detected during the initial drop test with respect to the article for an initial impact between the drop carriage and the base of the drop tower. A constant energy balance curve can be determined for at least one of a complex stiffness or a total weight of the article and the drop carriage with respect to a pulse duration of the initial impact. As such, the constant energy balance curve can relate the pulse duration with the complex stiffness and/or total weight of the article (e.g., for relatively small changes in the complex stiffness and/or the total weight). The complex stiffness can describe a spring factor and/or damping for one or more of the drop carriage or the base of the drop tower. For example, the drop tower can include one or more resilient members (e.g., springs, dampers, etc.) configured to absorb and/or dampen impact between the drop carriage and the drop tower. The method can include determining, based on the constant energy balance curve and a target pulse duration, at least one of a target complex stiffness or a target total weight for the article and the drop carriage. The method can include adjusting, based on the target complex stiffness or the target total weight, one or more of the complex stiffness or the total weight for a subsequent drop test. A subsequent drop test can be conducted after adjusting one or more of the complex stiffness or the total weight for the subsequent drop test. As a result of the adjustment based on the target complex stiffness, the subsequent drop test can substantially achieve the target pulse duration. In some instances, one or more additional iterations may be performed in which one or more of the above steps is repeated until the target pulse duration is achieved. Thus, the present method can achieve the target pulse duration with a single or small number of adjustments and/or drop test iterations.

In some embodiments, the method can include determining initial drop conditions for the initial drop test before dropping the carriage and the article for the initial drop test. The initial drop conditions can be determined based on one or more respective predetermined adjustment range for at least one initial drop condition of the initial drop conditions. The initial drop conditions can include at least of one an initial drop height, an initial complex stiffness, an initial total weight of the article and the drop carriage, or a carriage weight of the drop carriage. The predetermined adjustment range can describe at least an upper bound or a lower bound for the initial drop condition(s). The predetermined adjustment range can correspond with practical adjustment limits for the weight, complex stiffness, drop height, or one or more additional parameters associated with the drop test. For instance, the predetermined adjust range can be based on a maximum weight that can be safely added to the drop carriage. As another example, the predetermined adjustment range can correspond with a minimum weight needed to overcome friction between the drop carriage and drop frame to properly perform the drop test. As a further example, the predetermined adjustment range can correspond with a range of complex stiffness, such as a maximum number of resilient members that can be configured to absorb and/or dampen impact between the drop carriage and the drop tower. The predetermined adjustment range can describe at least the respective upper bounds and/or lower bounds for one or more of the initial drop condition(s).

The constant energy weight curve and/or constant energy complex stiffness curve for the system can be determined based on the empirically detected accelerometer data. Local peak acceleration maxima can be detected and used to determine an equivalent spring rate (K) and an equivalent damping coefficient (C) for an equivalent single degree-of-freedom representation of the system. The equivalent spring rate (K) and the equivalent damping coefficient (C) can be used to determine a constant energy weight curve (mEqvar) and/or constant energy complex stiffness curve (kEq) for the system.

In some embodiments, the constant energy balance curve can be automatically determined by one or more computing devices. For example, an operator can input a target pulse duration before or after performing the initial drop test. The target complex stiffness and/or the target total weight for the article and the drop carriage can be automatically determined by the computing device(s) in response to detecting the accelerometer data for the initial drop test and/or in response to receiving the user input. For example, the computing device(s) can automatically determine the target complex stiffness and/or the target total weight after both the user input received and the initial drop test is performed.

The computing device(s) can provide data for display that describes the target complex stiffness and/or target total weight. For example, the computing device(s) can display target complex stiffness and/or target total weight. As another example the computing device(s) can display instructions to add, remove, or adjust a spring, damper, or other resilient member. As a further example, the computing device(s) can display an instruction to increase or decrease the total weight by a particular amount to achieve the target total weight. Thus, the computing device(s) can provide data for display that describes the target complex stiffness and/or target total weight.

The constant energy balance curve can relate the pulse duration with the complex stiffness and/or total weight of the article such that the target pulse duration can be achieved by adjusting the complex stiffness and/or total weight with reference to the constant energy balance curve. The constant energy balance curve can include a constant energy weight curve (mEqvar), which can relate the total energy of the article and carriage with the pulse duration. The constant energy weight curve can correspond with the total weight, such that pulse durations can be estimated based on the total weight from the constant energy weight curve. The total weight of the combination of the carriage and test article can be adjusted, for example, by adjusting the number and/or size of the weights coupled to the carriage. The pulse duration experienced by the test article in the subsequent drop test can be adjusted by adjusting the total weight of the carriage and test article for the subsequent drop test. Such adjustment can be achieved without changing the total energy amount of energy imparted to the test article. Generally, increasing the total weight of the carriage and the test article increases the pulse duration. Generally, decreasing the total weight of the carriage and the test article decreases the pulse duration. Thus, the constant energy balance curve can include the constant energy weight curve (mEqvar), which can relate the total energy of the article and carriage with the pulse duration.

The constant energy balance curve can include a constant energy complex stiffness curve (kEq). The constant energy complex stiffness curve (kEq) can relate the complex stiffness with the pulse duration. Adjusting the complex stiffness can adjust the pulse duration experienced by the test article in a subsequent drop test without changing the total energy amount of energy imparted to the test article. Generally, increasing the complex stiffness can decrease the pulse duration, and decreasing the complex stiffness increases the pulse duration. Thus, the constant energy balance curve can include the constant energy complex stiffness curve to relate the complex stiffness with the pulse duration.

Generally, only one of the target complex stiffness and target total weight for the article and the drop carriage is adjusted between drop tests. After conducting the initial drop test the operator adjust the total weight of the carriage based on the constant energy weight curve of the constant energy balance curve without adjusting the complex stiffness to achieve a pulse duration during the subsequent drop test that is closer to and/or equal to the target pulse duration. Alternatively, the operator can adjust the complex stiffness based on the constant energy complex stiffness curve without adjusting the total weight for the subsequent drop test. However, in other embodiments, the operator can adjust both the total weight and the complex stiffness after the initial drop test and before the subsequent drop test. Thus, the operator can adjust one or more test parameters based on the constant energy balance curve to achieve the target pulse duration and/or approach the target pulse duration for the subsequent drop test.

Aspects of the present disclosure are directed to receiving user input and/or communicating data (e.g., instructions, test parameters, etc.) to the operator of the test by a testing computing system. For example, the testing computing system can save testing configurations for later retrieval. Each particular testing configuration can include a variety of testing parameters. A user interface of the testing computing system can display one or more of the testing parameters, such as total weight (e.g., Combined Mass (kg)), one or more complex stiffness parameters (e.g., Spring Rate (N/m) and/or Damping Coefficient (kg/s), Number of spring systems), Drop height (e.g., Height (ft)). Additional information, such as descriptions and/or images, can be associated and/or stored with testing configurations.

The testing computing system can provide for display one or more target parameters, such as target pulse duration (e.g., Target Pulse Width (s)) and/or target amplitude (g). The example user interface can include a table of testing configurations. The table can include rows corresponding with respective testing configurations. The table can include a variety of testing configurations, such as Spring Rate (N/m), Damping Coefficient (kg/s), Drop Height (ft), Pulse Width (s), and Damping Status. The testing computing system can be configured to determine whether the initial drop conditions are within the predetermined adjustment range. The testing computing system can provide display data describing whether the initial drop conditions can be adjusted within the predetermined adjustment range to achieve the target pulse width. For example, the table can also include an indication of whether the testing parameters can be adjusted to achieve the target pulse width. For example, a "Matches Target?" column can indicate whether adjusting the total weight, drop height, and/or complex stiffness can be used to achieve the target pulse width. An example entry in the "Matches Target?" can include "Possible," which can indicate that adjustment of one or more of the above parameters within the predetermined adjustment range can be used to achieve the target pulse width from the initial drop conditions. Another example entry can include "Fail: Need Softer Springs," which can indicate that the complex stiffness is not within the predetermined adjustment range. For example, one or more of the resilient members may need to be removed, adjusted, and/or replaced to achieve the desired target pulse width. Such a large adjustment may change the dynamics of the setup such that the constant energy balance curve cannot accurately predict the pulse duration. Additional example table entries may include an indication of how much the total weight and/or complex stiffness should be adjusted to reach suitable initial drop conditions. For instance, one or more instructions can be provided to adjust the complex stiffness (e.g., to add, remove, and/or adjust a spring, damper or other resilient member) and/or total weight (e.g., to add or remove a particular weight). Thus, the testing computing system can assist the operator with configuring the system for the initial drop test.

Aspects of the present disclosure provide a variety of benefits with respect to autonomous vehicles operation, design, and/or fleet management. Drop tests performed according to aspects of the present disclosure can be used to test one or more autonomous vehicle components for reliability and durability. For example, the autonomous vehicle component(s) can include sensors, such as Light Detection and Ranging (LIDAR) system, a Radio Detection and Ranging (RADAR) system, one or more cameras (e.g., visible spectrum cameras, infrared cameras, etc.), a positioning system (e.g., GPS), and accelerometers. The autonomous vehicle component(s) can include computing system components, such as processors, memory, connectors, power supplies, and the like. Additional example autonomous vehicle components can include mounting hardware for one or more of the above components and/or assemblies including multiple components. In some embodiments, complete autonomous vehicles can be subject to drop tests. Further, in some embodiments, an autonomous vehicle can be subjected to drop tests with one or more anthropomorphic test device(s) (ATD) inside the autonomous vehicle. The ATD can be configured to simulate the dimensions, weight, proportions, and/or articulations of humans. Thus, the present disclosure can provide for improved drop testing of autonomous vehicles and/or components thereof.

Example aspects of the present disclosure can provide for a number of technical effects and benefits, including improvements to computing systems. For example, the systems and methods described herein can reduce the number of trial drop tests needed to achieve desired drop test characteristics, such as pulse duration, peak acceleration, or the like. A constant energy balance curve can be determined for a complex stiffness and/or a total weight of the article and the drop carriage with respect to a pulse duration of the initial impact. Thus, the constant energy balance curve can correlate the pulse duration with one or more test parameters. At least one of a target complex stiffness or a target total weight for the article and the drop carriage for a subsequent drop test can be determined based on the constant energy balance curve and a target pulse duration. Thus, the complex stiffness and/or the total weight can be adjusted for the subsequent drop test based on the constant energy balance curve. As a result, the pulse duration for the subsequent drop test can be close or substantially equal to the target pulse duration. Thus, the systems and methods described herein can facilitate achieving the target pulse duration in a small number (e.g., two or three) drop test iterations instead of requiring a larger number of drop test iterations. As a result, consumption of resources associated with conducting drop test can be reduced, such as power consumption, wear and tear on components (e.g., resilient members, surfaces impacted during the drop tests, and the like).

Various means can be configured to perform the methods and processes described herein. For example, a testing computing system unit can include one or more processors for performing the operations and functions described herein. The means can include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to detect first accelerometer data from one or more sensor means with respect to the article for an initial impact of an initial drop test between the drop carriage and the base of the drop tower when the drop carriage and article are dropped from an initial height with respect to a base of the drop tower for an initial drop test. The means can be configured to determine a constant energy balance curve for at least one of a complex stiffness or a total weight of the article and the drop carriage with respect to a pulse duration of the initial impact, the complex stiffness being for at least one of the drop carriage or the base of the drop tower. The means can be configured to determine, based on the constant energy balance curve, the first accelerometer data, and a target pulse duration, at least one of a target complex stiffness or a target total weight for the article and the drop carriage and detect second accelerometer data with respect to the article for a subsequent drop test between the drop carriage and the base of the drop tower with the target complex stiffness and/or the target total weight for the article and the drop carriage. The testing computer system means is one example means for performing the above operations.

One or more sensor means can include accelerometers, microphones, image/video capture devices and the like. The sensor means can be configured to detect/capture acceleration data, such as the first accelerometer data and second accelerometer data. Mircophone(s) can be used to capture sound data during impact(s) of the drop test(s). Peak sound pressure levels (SPL) can be determined for the impact. The peak SPL can be used to estimate an amount of energy dissipated during the impact through sound. Image/video capture device can be used to track speed, acceleration, and the like of the drop carriage during the drop test(s). The sensor mean(s) is one example means for performing the above operations.

One or more drop test assembly means can be used to conduct drop tests according to aspects of the present disclosure. For example, the drop test assembly means can include a drop tower, a carriage, a platform, and/or resilient members.

FIG. 1 depicts an example system 100 overview according to example implementations of the present disclosure. The system 100 can include a drop test assembly 102, for example as described below with respect to the drop test assembly 200 of FIG. 2. The system 100 can include one or more sensors 104 configured to detect sensor data 106 with respect to the article for drop test impact(s) (e.g., between the drop carriage and the base of the drop tower), for example as described below with respect to the sensors 215 of FIG. 2.

The testing computing system 108 can include one or more processors 110 such as microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The testing computing system 108 can include memory 112 such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

In some embodiments, the testing computing system 108 can include one or more user input components 114 configured to detect a user input. For example, the user input can request, instruct, and/or define one or more parameters for one or more of the operations described herein. For example, the user input can describe an initial height target, a target pulse duration, a total weight for the article and drop carriage, and/or a complex stiffness.

The testing computing system 108 can be configured to detect and/or receive sensor data 106 (e.g., accelerometer data) from the sensor(s) 104 during the test impact(s).

In some embodiments, the testing computing system 108 can be configured to determining the constant energy balance curve for at least one of the complex stiffness or the total weight of the article and the drop carriage with respect to the pulse duration of the initial impact. In some embodiments, the testing computing system 108 can be configured to determine, based on the constant energy balance curve, the first accelerometer data, and/or a target pulse duration, at least one of a target complex stiffness or a target total weight for the article and the drop carriage.

Figure 2A:
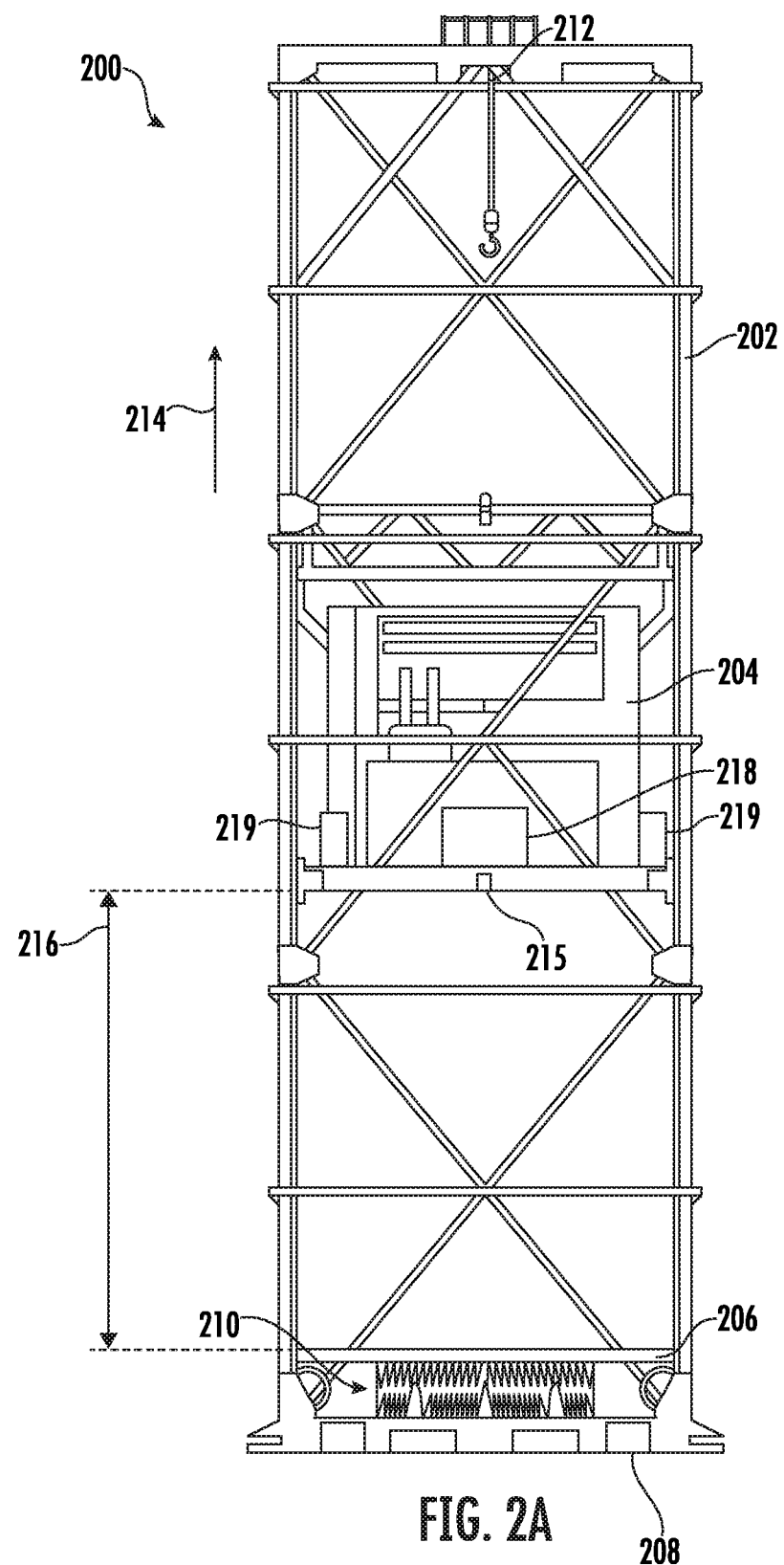
FIG. 2A depicts an example drop test assembly according to aspects of the present disclosure.

FIG. 2A depicts an example drop test assembly 200 according to aspects of the present disclosure. The drop test assembly 200 can include a drop tower 202, a carriage 204, and a platform 206. The platform 206 can be supported with respect to a base 208 of the drop tower 202 by one or more resilient members 210. The resilient members 210 can be or include springs (e.g., leaf, coil, or any other suitable configuration), elastomeric rope, elastomeric pads, dampers, or the like).

The drop test assembly 200 can include a wench 212 or other mechanism for raising the carriage 204 (as illustrated by arrow 214) to perform drop tests. The carriage 204 can be slidably engaged with the drop tower 202 such that the carriage 204 travels along the drop tower 202 and impacts the platform 206 when the carriage 204 is released from a drop height (as illustrated by arrow 216).

A test article 218 can be coupled to the carriage 204. For example, the test article 218 can be affixed to the carriage 204 such that the test article 218 is dropped along with the carriage 204 when the carriage 204 is released. Example test articles 218 include automotive components (e.g., electronic, mechanical, etc.), complete vehicles (e.g., autonomous vehicles, semi-autonomous vehicle, etc.), and/or anthropomorphic test device (ATD) for simulating passengers aboard the vehicle. However, it should be understood that the test article 218 can be or include any item for which an impact simulation is desired. One or more weights 219 can be coupled to the carriage 204.

The drop test assembly 200 can include one or more sensors 215, such as accelerometers. The sensors 215 can be coupled and/or affixed to the carriage 204. The test article 218 can be coupled and/or affixed to the carriage 215 such that accelerations of carriage 204 detected by the sensors 215 are indicative of accelerations experienced by the test article 218. However, in other embodiments, the sensors 215 can be coupled and/or affixed directly to the test article 218.

FIG. 2B is an enlarged perspective view of the platform 206, resilient members 210, and base 208 of the drop tower 202. As shown in FIG. 2B, in some embodiments, the resilient members 210 can include coil springs 220 and pads 222. The coil springs 220 can be coupled between the platform 206 and the base 208 of the drop tower 202. The pads 222 can be disposed on top of the platform 206 such that the carriage 204 contacts the pads 222 when impacting the platform 206.

FIG. 3A depicts a chart 300 of simulated and detected accelerometer data for an initial drop test according to aspects of the present disclosure. Comparison with the simulated accelerometer data of FIG. 3A indicates that the simulated accelerometer data and detected accelerometer data can have approximately equal peak values 302, but can deviate over the following 0.7 seconds. More specifically, an initial drop test can be conducted in which the carriage 204 (with the article 218 coupled to the carriage 204) is dropped from an initial height with respect to the platform 206. The accelerometer data can be collected with respect to the article 218 for an initial impact of the initial drop test between the carriage 204 and the base 208 of the drop tower 202. The simulated accelerometer data can be theoretically calculated using principles of conservation of energy and momentum. For example, the drop test can be divided into three events. During the first event, the article 218 and carriage 204 free fall from the initial height until impact with the platform 206. In the second event, the article 218 and carriage 204 impact the platform 206. During the third event, the article 218 and carriage 204 oscillate together with the platform 206. These events are theoretically modeled as follows. For the first event the potential energy of the platform 206 and article 218 at the initial height is equal to the kinetic energy of the platform 206 and article 218 immediately prior to impact with the platform 206. The equation below illustrates the conservation of energy during the first event, in which m represents a combined mass of the platform 206 and article 218; g represents the gravitational constant; h represents the initial height; and v represents the velocity at impact. As shown below v is a function of h.

$$mgh = \tfrac{1}{2}mv^2 \rightarrow v = \sqrt{2gh} \quad (1)$$

Next, during the second event, the impact can be modeled according to the conservation of momentum, in which mcarraige is the mass of the carriage 204; vinitial is the velocity of the carriage 204 and the article 218 immediately prior to impact; vfinal is the velocity of the carriage 204, the article 218, and the platform 206 immediately after impact; mcombined is a combined mass of the carriage 204, article 218, and the platform 206; g is the gravitational constant, and h is the initial height:

$$m_{carriage} * v_{initial} = m_{combined} * v_{final} \rightarrow v_{final} = \frac{m_{carriage} * \sqrt{2gh}}{m_{combined}} \quad (2)$$

Lastly, the third event can be represented by a spring response of the resilient members 210 supporting the combined mass of the carriage 204, article 218, and the platform 206, in which initial conditions of the system can expressed as follows:

$$\text{InitialConditions } v_{initial} = \frac{m_{carriage} * \sqrt{2gh}}{m_{combined}}, \quad (3)$$

other initial conditions equal zero $v_{final}$ from Event 2 becomes $v_{initial}$ However, this simulation corresponds with a simplified, ideal scenario that generally differs from reality. More particularly, this system representation has been simplified to a single degree-of-freedom model. A multiple degree-of-freedom model would require calculating independent spring rates and damping coefficients for each component (each component exhibits some amount of flex) and modeling each interaction therebetween. In reality, the spring rate of the spring component of the system is non-linear. Simulating such non-linearity, however, can be difficult. Further, in some embodiments, the resilient member 210 include elastomer dampers, which can exhibit varying changes with changes in dynamic input.

In some embodiments, the above determinations/calculations can be performed automatically by a computing system (e.g., testing computing system 108) in response to detecting the accelerometer data. However, in other embodiments, one or more the above determinations may be performed and/or assisted by a human operator. Thus, the above determinations can be fully or partially automated/assisted by computing system.

FIG. 3B illustrates empirically detected accelerometer data for an example drop test. The vertical axis corresponds to measured acceleration in standard gravity units (g), corresponding to the Earth's gravitational acceleration. The horizontal axis corresponds with time in milliseconds.

A constant energy weight curve (mEqvar) and/or constant energy complex stiffness curve (kEq) for the system can be determined based on the empirically detected accelerometer data. Local peak acceleration maxima 320-328 can be detected and used to determine an equivalent spring rate (K) and an equivalent damping coefficient (C) for an equivalent single degree-of-freedom representation of the system and/or the initial drop test. The equivalent spring rate (K) and the equivalent damping coefficient (C) can be used to determine a constant energy weight curve (mEqvar) and/or constant energy complex stiffness curve (kEq) for the system, for example as described below with reference to FIG. 3C.

For example, the logarithmic decrement, Δ, can be calculated based on the local peak acceleration maxima 320-328. The logarithmic decrement can be used to determine a natural frequency, ωn, and equivalent damping, as follows:

$$\zeta = \frac{\Delta/2\pi}{\sqrt{1+(\Delta/2\pi)^2}} \quad (4)$$

$$\omega_n = \frac{\omega_d}{\sqrt{1-\zeta^2}} = \sqrt{1+\left(\frac{\Delta}{2\pi}\right)^2}\,\omega_d \quad (5)$$

where $$\Delta = \ln\left(\frac{x_1}{x_2}\right) = \zeta\omega_n(t_2 - t_1) = \zeta\omega_n\frac{2\pi}{\omega_d} = \frac{2\pi\zeta}{\sqrt{1-\zeta^2}}. \quad (6)$$

In Equations 4-6, x1 corresponds with an acceleration value of a first peak local peak acceleration maxima 320; t1 corresponds with a time of the first peak local peak acceleration maxima 320; t2 corresponds with a time of the second peak local peak acceleration maxima 322; x2 corresponds with an acceleration value of a second peak local peak acceleration maxima 322; and ωd corresponds with a damped natural frequency of the system. However, it should be understood that any adjacent pair of local peak acceleration maxima 320-328 can be used. An equivalent simplified single degree-of-freedom system can be determined based on the natural frequency, equivalent damping, and combined mass of the carriage 204, article 218, and the platform 206. More particularly, an equivalent spring rate (K) and an equivalent damping coefficient (C) for the equivalent simplified single degree-of-freedom system of the initial drop test can be determined. The equivalent spring rate (K) and the equivalent damping coefficient (C) can be used to determine a constant energy weight curve (mEqvar) and/or constant energy complex stiffness curve (kEq) for the system, for example as described below with reference to FIG. 3C. For example, the constant energy weight curve (mEq$_{var}$) and/or constant energy complex stiffness curve (kEq) can be determined based on an assumption that for small changes in the complex stiffness and/or total weight of the carriage 204 and test article 218, that the system can be modeled by the equivalent simplified single degree-of-freedom system described above.

In some embodiments, one or more of the above determinations can be performed automatically by a computing system (e.g., testing computing system 108) in response to detecting the accelerometer data. However, in other embodiments, one or more the above determinations may be performed and/or assisted by a human operator. For instance, the human operator can visually locate one or more local peak acceleration maxima 320-328 points based on a review of a visual plot of the detected acceleration data (e.g., as represented by FIG. 3B). Alternatively, the computing system can automatically locate the local peak acceleration maxima 320-328 points on a visual plot of the detected acceleration data, and the human operator can confirm that the computing system has correctly automatically located the local peak acceleration maxima 320-328 points. In some embodiments, each step described herein with respect to FIG. 3B can be sequentially automatically performed by the computing system in response to detecting the accelerometer data without receiving an input by a human operator. Thus, the above determinations can be fully or partially automated/assisted by computing system.

Figure 3C:
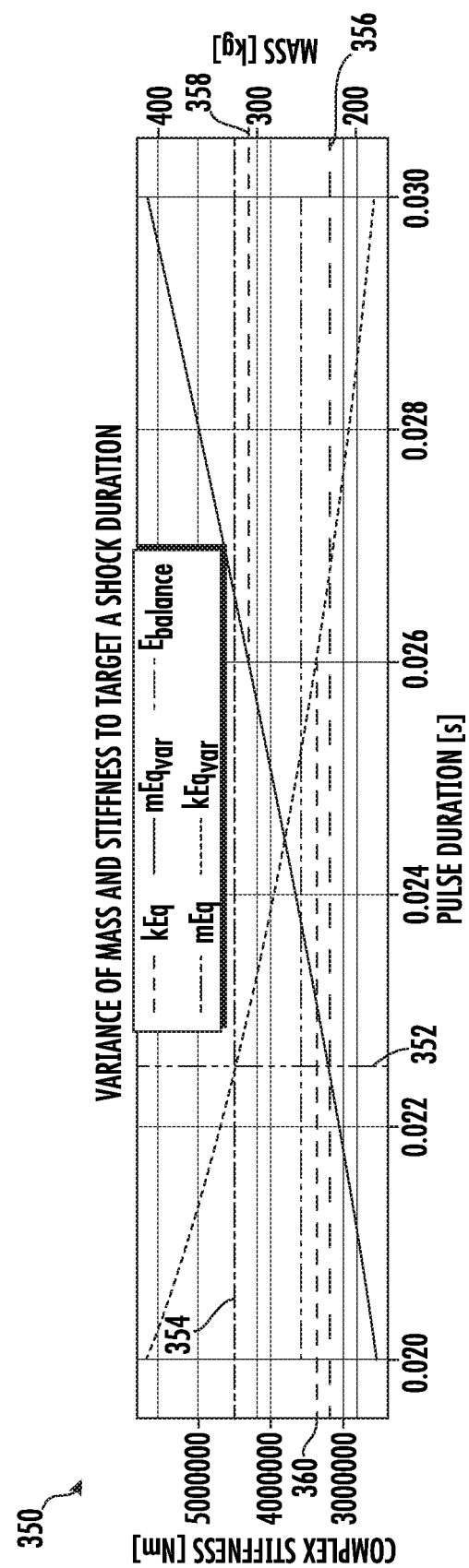
FIG. 3C depicts a chart of a constant energy balance curve according to aspects of the present disclosure.

FIG. 3C depicts a chart 350 of a constant energy balance curve according to aspects of the present disclosure. The chart 350 of FIG. 3C includes a constant energy weight curve (mEq$_{var}$). The constant energy weight curve (mEq$_{var}$) corresponds with the right total weight axis. The total weight of the combination of the carriage 204 and test article 218 can be adjusted, for example, by adjusting the number and/or size of the weights 219 coupled to the carriage 204. Adjusting the total weight of the carriage 204 and test article 218 for a subsequent drop test can adjust the pulse duration experienced by the test article 218 in the subsequent drop test without changing the total energy amount of energy imparted to the test article 218. As shown by the constant energy weight curve (mEqvar), increasing the total weight of the carriage 204 and the test article 218 increases the pulse duration. Decreasing the total weight of the carriage 204 and the test article 218 decreases the pulse duration.

The chart 350 includes a constant energy complex stiffness curve (kEq). The constant energy complex stiffness curve (kEq) corresponds with the left stiffness axis. Adjusting the complex stiffness, for example by adjusting the resilient members 210, adjust the pulse duration experienced by the test article 218 in a subsequent drop test without changing the total energy amount of energy imparted to the test article 218. As shown by the constant energy complex stiffness curve (kEq), increasing the complex stiffness can decrease the pulse duration. Decreasing the complex stiffness increases the pulse duration.

In some embodiments, a target complex stiffness or a target total weight for the article 218 and the drop carriage 204 can be determined based on the based on the constant energy balance curve and a target pulse duration. For example, referring to FIG. 3C, an example initial drop is illustrated by vertical line 352. The vertical line 352 intersects the constant energy complex stiffness curve (kEq) (as illustrated by a stiffness dashed line 354). The vertical line 352 intersects the constant energy weight curve (mEqvar) (as illustrated by a weight dashed line 356). In this example, for a target pulse duration value of 0.026 seconds, the target total weight can be determined to be about 310 kg (corresponding with dashed line 358). Alternatively, for the same target pulse duration value, the target complex stiffness can be determined to be about 3,400,000 Nm.

The complex stiffness and/or the total weight for a subsequent drop test can be adjusted based on the target complex stiffness or the target total weight. For example, an operator can add or remove one or more weights from the carriage 204 and/or add, remove, or otherwise adjust one or more resilient members 210. In other embodiments, a robotic arm or the like could adjust the weigh and/or stiffness in a similar manner. The subsequent drop test can be conducted after adjusting the complex stiffness and/or the total weight for the subsequent drop test. Thus, the subsequent drop test can be conducted with the complex stiffness at the target complex stiffness as determined by based on the constant energy balance curve or conducted with the total weight at the target total weight.

The equivalent spring rate (K) and an equivalent damping coefficient (C) can be determined for the initial drop as described above with reference to FIG. 3B. The spring rate (K) and damping coefficient (C) can be linear approximations of the non-linear flex and damping of the system. The equivalent spring rate (K) and equivalent damping coefficient (C) can be used to determine a suitable drop height for the test that produces a desired impact pulse acceleration peak and pulse duration, within respective specified tolerances (e.g., 15%, 10%, etc.).

FIG. 4 illustrates an example user interface 400 for receiving user input of a testing computer system, for example corresponding to the testing computer system 108 of FIG. 1. In this example, a profile title 402 can be associated with a particular testing configuration including a variety of testing parameters. The user interface can display one or more of the testing parameters, such as a total weight 404 (e.g., Combined Mass (kg)), one or more complex dynamic parameters 406. The complex dynamic parameters 406 can include Spring Rate (N/m) 408 (e.g., equivalent spring rate (K)), Damping Coefficient (kg/s) 410 (e.g., equivalent damping coefficient (C)) and/or Number of spring systems 412. The user interface can also display Drop height (e.g., Height (ft) 414). Additional information can be associated with the testing configuration such as a description 416 and/or image 418

FIG. 5 illustrates another example user interface 500 of the testing computing system 108. Testing parameters 502 are displayed, including one or more target parameters, such as target pulse duration (e.g., Target Pulse Width (s)) and/or target amplitude (g). The example user interface 500 can include a table of testing configurations. For each testing configuration, an indication of whether the initial drop conditions can be adjusted to achieve the target test conditions based on a predetermined adjustment range correspond with a range of complex stiffness.

Figure 6:
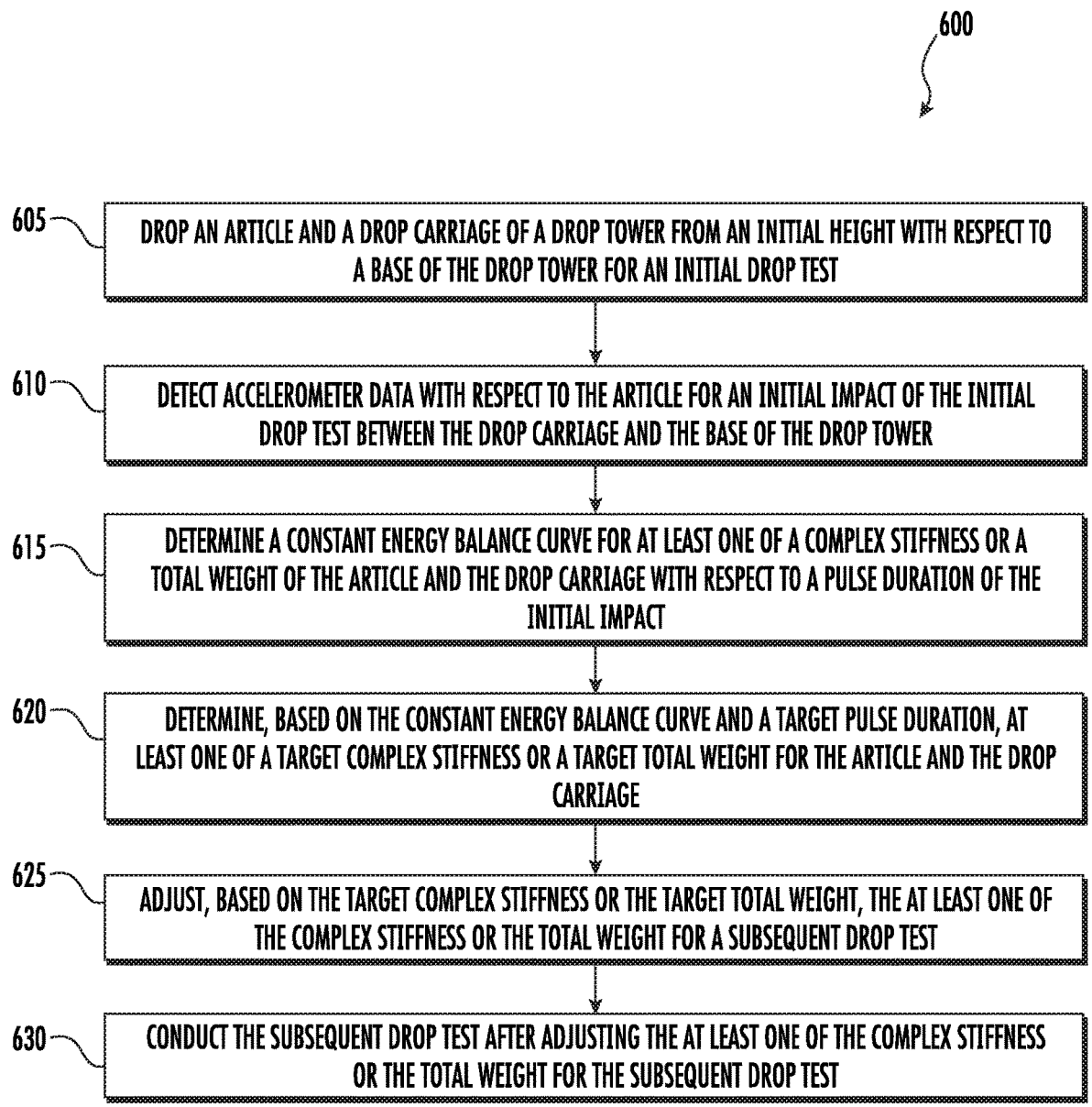
FIG. 6 depicts an example flow diagram of an example method for conducting a drop test of an article with one or more target parameters.

FIG. 6 depicts an example flow diagram of an example method 600 for automatically assigning vehicle identifiers for autonomous vehicles according to example implementations of the present disclosure. One or more portion(s) of the method 600 can be implemented by a computing system that includes one or more computing devices such as, for example, the computing systems described with reference to the other figures (e.g., the testing computing system 108). Each respective portion of the method actions can be performed by any (or any combination) of one or more computing devices. Moreover, one or more portion(s) of the method actions can be implemented as an algorithm on the hardware components of the device(s) described herein. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for example illustrated purposes and is not meant to be limiting. One or more portions of method actions can be performed additionally, or alternatively, by other systems.

Figure 8:
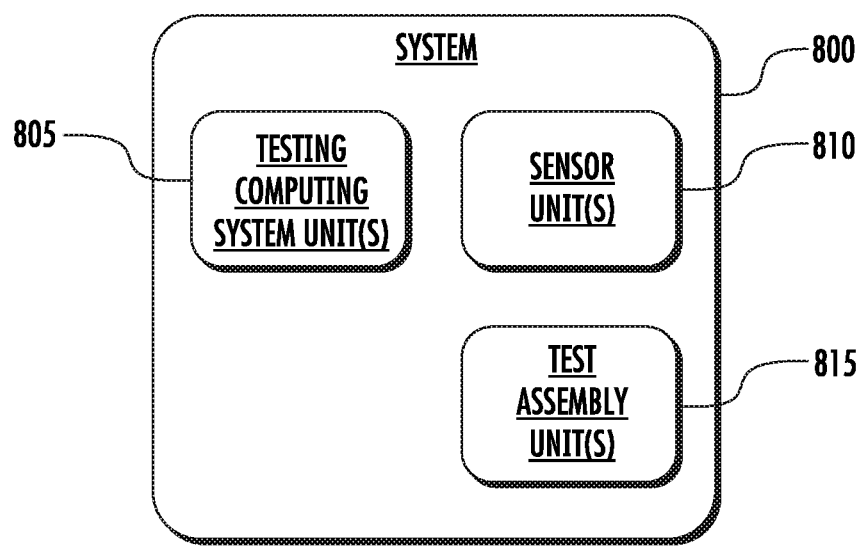
FIG. 8 depicts system components of an example system according to example implementations of the present disclosure.

At (605), the method 600 can include dropping an article and a drop carriage of a drop tower from an initial height with respect to a base of the drop tower for an initial drop test, for example as described above with respect to FIGS. 2A and 2B. The article can coupled to the drop carriage. The test assembly unit(s) 815 described below with reference to FIG. 8 is one example means for dropping the article and the drop carriage from the initial height. The article can be or include or one or components of autonomous vehicle.

At (610), the method 600 can include detecting accelerometer data with respect to the article for an initial impact of the initial drop test between the drop carriage and the base of the drop tower, for example as described with respect to FIGS. 3A and 3B. The sensor unit(s) 810 described below with reference to FIG. 8 is one example means for detecting the accelerometer data.

At (615), the method 600 can include determining a constant energy balance curve for at least one of a complex stiffness or a total weight of the article and the drop carriage with respect to a pulse duration of the initial impact. The constant energy weight curve (mEqvar) and/or the constant energy complex stiffness curve (kEq) for the system can be determined based on the detected accelerometer data. For example, local peak acceleration maxima of the detected accelerometer data can be detected and used to determine an equivalent spring rate (K) and an equivalent damping coefficient (C) for an equivalent single degree-of-freedom representation of the system, for example as described above with reference to FIG. 3B. The equivalent spring rate (K) and the equivalent damping coefficient (C) can be used to determine a constant energy weight curve (mEqvar) and/or constant energy complex stiffness curve (kEq) for the system, for example as described above with reference to FIG. 3B.

The complex stiffness can be for at least one of the drop carriage or the base of the drop tower. The testing computing system unit(s) 805 described below with reference to FIG. 8 is one example means for determining the constant energy balance curve for the complex stiffness and/or the total weight.

At (620), the method 600 can include determining, based on the constant energy balance curve and a target pulse duration, at least one of a target complex stiffness or a target total weight for the article and the drop carriage, for example as described above with reference to FIGS. 3A and 3B. The testing computing system unit(s) 805 described below with reference to FIG. 8 is one example means for determining the constant energy balance curve for the complex stiffness and/or the total weight.

At (625), the method 600 can include adjusting, based on the target complex stiffness or the target total weight, the complex stiffness and/or the total weight for a subsequent drop test, for example as described above with reference to FIGS. 2A, 2B, and 3B. For example, an operator of the test can add or remove one or more weights from the drop carriage. As another example, the operator can add, remove, or adjust one or more resilient members from the testing assembly.

At (630), the method 600 can include conducting the subsequent drop test after adjusting the complex stiffness and/or the total weight for the subsequent drop test. For example, the operator can raise the drop carriage and article to a drop height. The drop height can be equal to the initial height for the initial drop test. However, in some embodiments, the drop height can be different than the initial drop test.

Figure 7:
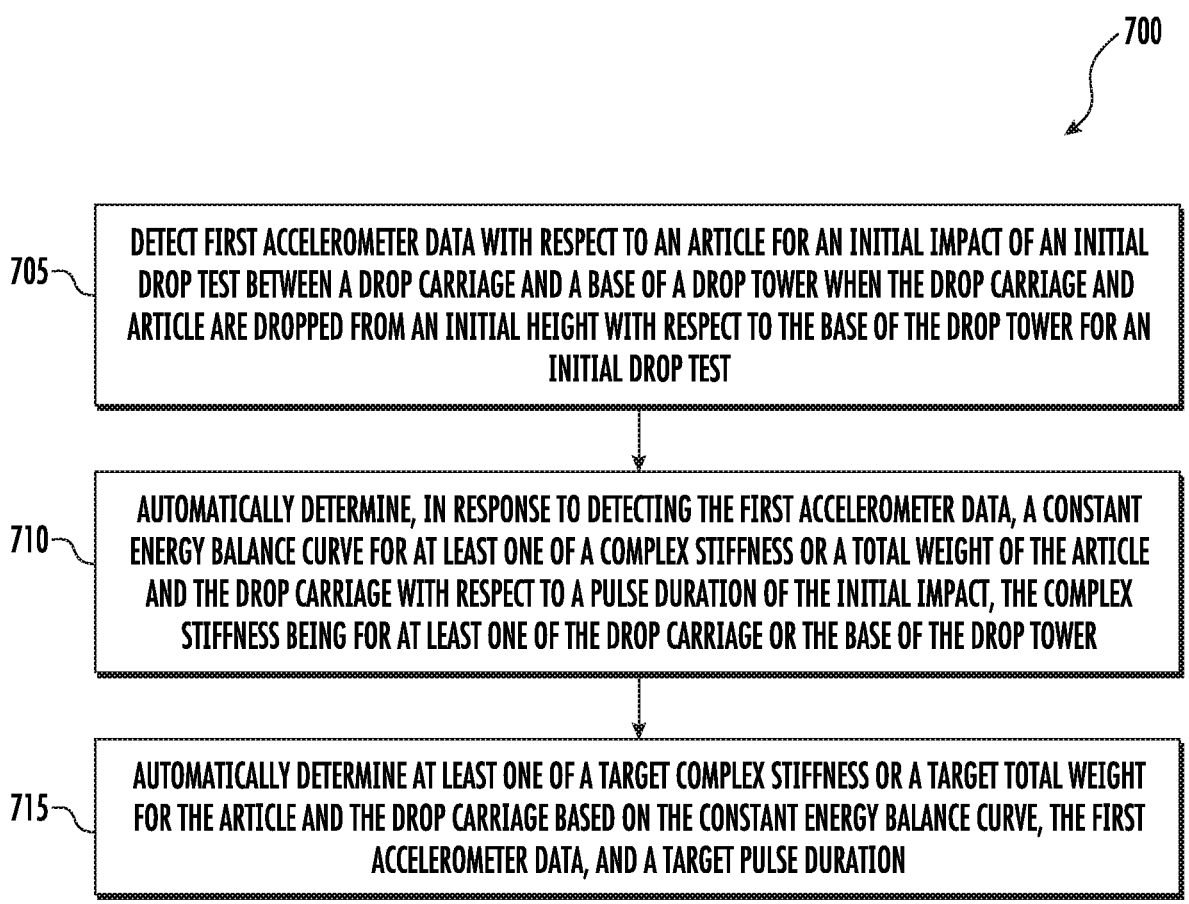
FIG. 7 depicts an example flow diagram of an example method for conducting a drop test of an article with one or more target parameters.

FIG. 7 depicts an example flow diagram of an example method 700 for automatically assigning vehicle identifiers for autonomous vehicles according to example implementations of the present disclosure. One or more portion(s) of the method 700 can be implemented by a computing system that includes one or more computing devices such as, for example, the computing systems described with reference to the other figures (e.g., the testing computing system 108). Each respective portion of the method actions can be performed by any (or any combination) of one or more computing devices. Moreover, one or more portion(s) of the method actions can be implemented as an algorithm on the hardware components of the device(s) described herein Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for example illustrated purposes and is not meant to be limiting. One or more portions of method actions can be performed additionally, or alternatively, by other systems.

At (705), the method 700 can include detecting first accelerometer data with respect to the article for an initial impact of an initial drop test between the drop carriage and the base of the drop tower when the drop carriage and article are dropped from an initial height with respect to a base of the drop tower for an initial drop test, for example as described with respect to FIGS. 2A through 3A. The sensor unit(s) 810 described below with reference to FIG. 8 is one example means for detecting the first accelerometer data.

At (710), the method 700 can include automatically determining, in response to detecting the first accelerometer data, a constant energy balance curve for at least one of a complex stiffness or a total weight of the article and the drop carriage with respect to a pulse duration of the initial impact, for example as described above with reference to FIGS. 3A through 3C. The complex stiffness can be for at least one of the drop carriage or the base of the drop tower. The constant energy weight curve (mEqvar) and/or the constant energy complex stiffness curve (kEq) for the system can be determined based on the detected accelerometer data. For example, local peak acceleration maxima of the detected accelerometer data can be detected and used to determine an equivalent spring rate (K) and an equivalent damping coefficient (C) for an equivalent single degree-of-freedom representation of the system, for example as described above with reference to FIG. 3B. The equivalent spring rate (K) and the equivalent damping coefficient (C) can be used to determine a constant energy weight curve (mEqvar) and/or constant energy complex stiffness curve (kEq) for the system, for example as described above with reference to FIG. 3B. The testing computing system unit(s) 805 described below with reference to FIG. 8 is one example means for automatically determining the constant energy balance curve for the complex stiffness and/or the total weight.

At (715), the method 700 can include automatically determine at least one of a target complex stiffness or a target total weight for the article and the drop carriage based on the constant energy balance curve, the first accelerometer data, and a target pulse duration, for example as described above with reference to FIG. 3B. The testing computing system unit(s) 805 described below with reference to FIG. 8 is one example means for automatically determining the target complex stiffness and/or the target total weight.

FIG. 8 depicts example system components of an example system 800 according to example implementations of the present disclosure. Various means can be configured to perform the methods and processes described herein. For example, a testing computing system unit 805 can include one or more processors for performing the operations and functions described herein. The means can include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to detect first accelerometer data from one or more sensor means with respect to the article for an initial impact of an initial drop test between the drop carriage and the base of the drop tower when the drop carriage and article are dropped from an initial height with respect to a base of the drop tower for an initial drop test. The means can be configured to determine a constant energy balance curve for at least one of a complex stiffness or a total weight of the article and the drop carriage with respect to a pulse duration of the initial impact, the complex stiffness being for at least one of the drop carriage or the base of the drop tower. The means can be configured to determine, based on the constant energy balance curve, the first accelerometer data, and a target pulse duration, at least one of a target complex stiffness or a target total weight for the article and the drop carriage and detect second accelerometer data with respect to the article for a subsequent drop test between the drop carriage and the base of the drop tower with the target complex stiffness and/or the target total weight for the article and the drop carriage. The testing computer system means 805 is one example means for performing the above operations.

One or more sensor unit(s) 810 can include accelerometers, microphones, image/video capture devices and the like. The sensor unit(s) 810 can be configured to detect/capture acceleration data, such as the first accelerometer data and second accelerometer data. Mircophone(s) can be used to capture sound data during impact(s) of the drop test(s). Peak sound pressure levels (SPL) can be determined for the impact. The peak SPL can be used to estimate an amount of energy dissipated during the impact through sound. Image/video capture device can be used to track speed, acceleration, and the like of the drop carriage during the drop test(s). The sensor unit(s) 810 is one example means for performing the above operations.

One or more drop test assembly unit(s) 815 can be used to conduct drop tests according to aspects of the present disclosure. For example, the drop test assembly unit(s) 815 can include a drop tower, a carriage, a platform, and/or resilient members, for example as described above with reference to FIGS. 2A and 2B.

As indicated above, aspects of the present disclosure provide benefits with respect to autonomous vehicles operation, design, and/or fleet management. Drop tests performed according to aspects of the present disclosure can be used to test one or more autonomous vehicle components for reliability and durability. For example, the test article can be or include an autonomous vehicle component and/or entire autonomous vehicle, for example as described below with reference to FIG. 9.

Figure 9:
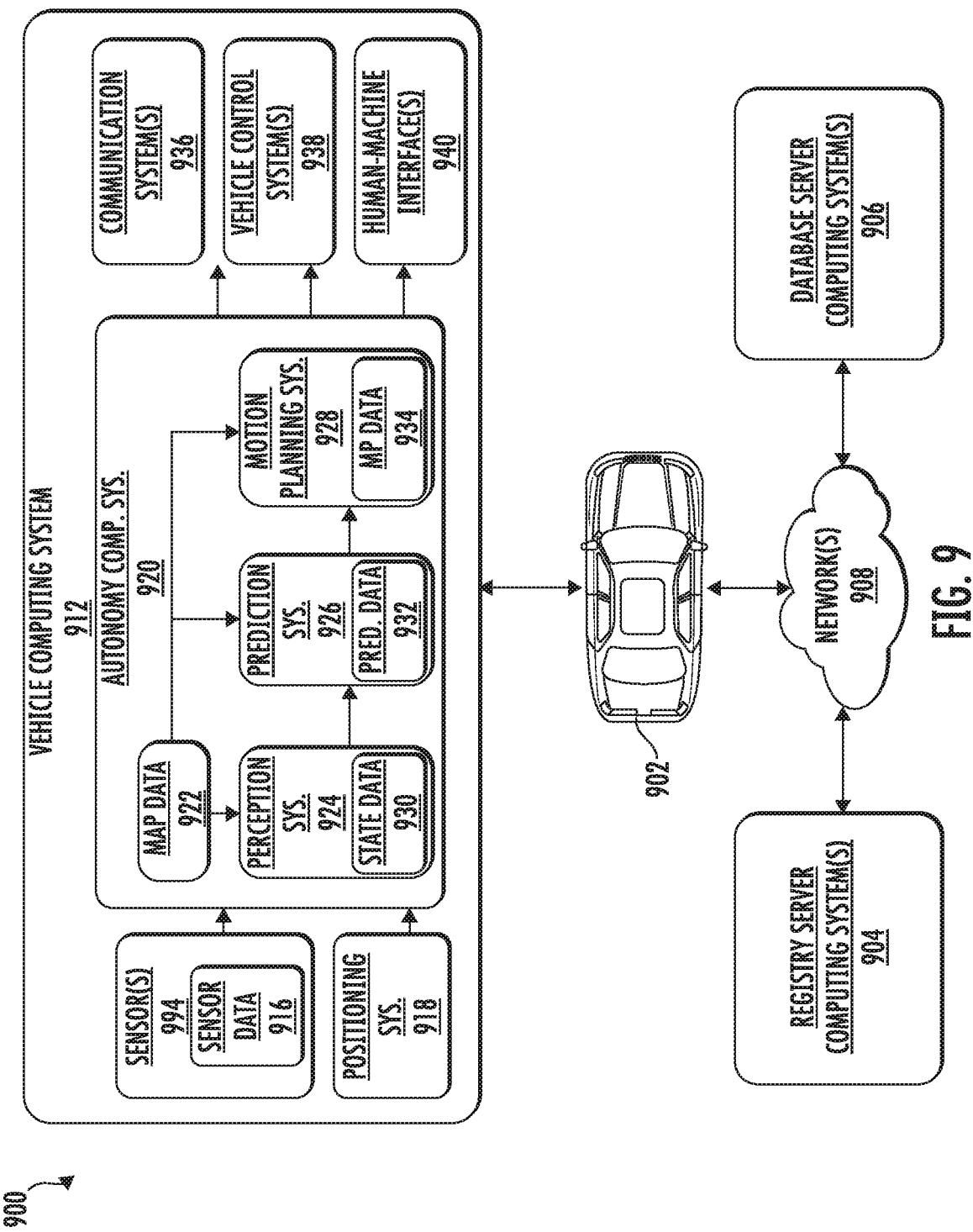
FIG. 9 depicts system components of an example system according to example implementations of the present disclosure.

FIG. 9 depicts an example system 900 overview according to example implementations of the present disclosure. An autonomous vehicle 902 can be a ground-based autonomous vehicle (e.g., car, truck, bus, bike, scooter, etc.) or another type of vehicle 902 (e.g., aerial vehicle, etc.) that can operate with minimal and/or no interaction from a human operator. An autonomous vehicle 902 can include a vehicle computing system 912 located onboard the autonomous vehicle 902 to help control the autonomous vehicle 902. The vehicle computing system 912 can be located onboard the autonomous vehicle 902, in that the vehicle computing system 912 can be located on or within the autonomous vehicle 902. The vehicle computing system 912 can include one or more sensors 914, an autonomy computing system 920 (e.g., for determining autonomous navigation), one or more vehicle control systems 938 (e.g., for controlling braking, steering, powertrain, etc.), and/or other systems. The vehicle computing system 912 can obtain sensor data 916 from sensor(s) 914 onboard the vehicle 902, attempt to comprehend the surrounding environment of the vehicle 902 by performing various processing techniques on the sensor data 916, and generate an appropriate motion plan through the surrounding environment of the vehicle 902.

The vehicle computing system 912 can receive sensor data 916 from one or more sensors 914 that are coupled to or otherwise included within the autonomous vehicle 902. For example, in some implementations, a perception system 924 can be included within the vehicle computing system 912 and configured to receive the sensor data 916. As examples, the one or more sensors 914 can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data 916 can include information that describes the location of static objects and/or dynamic objects (actors) within the surrounding environment of the autonomous vehicle 902. For example, the objects can include traffic signals, additional vehicles, pedestrians, bicyclists, signs (e.g., stop signs, yield signs), and/or other objects. The sensor data 916 can include raw sensor data and/or data that has been processed or manipulated in some manner before being provided to other systems within the autonomy computing system.

In addition to the sensor data 916, the vehicle computing system 912 can retrieve or otherwise obtain map data 922 that provides detailed information about the surrounding environment of the autonomous vehicle 902. The map data 922 can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop signs, yield signs), traffic lights (e.g., stop lights), or other traffic signals or control devices/markings (e.g., cross walks)); and/or any other map data 922 that provides information that assists the vehicle computing system 921 in comprehending and perceiving its surrounding environment and its relationship thereto.

Autonomous vehicles 902 can be utilized by the service entity to provide vehicle services can be associated with a fleet of the service entity or a third party. For example, the service entity may own, lease, etc. a fleet of autonomous vehicles 902 that can be managed by the service entity (e.g., its backend system clients) to provide one or more vehicle services. An autonomous vehicle 902 utilized to provide the vehicle service(s) can be included in this fleet of the service entity. Such autonomous vehicle 902 may be referred to as "service entity autonomous vehicles" or "first party autonomous vehicles." In some implementations, an autonomous vehicle 902 can be associated with a third party vehicle provider such as, for example, an individual, an original equipment manufacturer (OEM), a third party vendor, or another entity. These autonomous vehicles 902 may be referred to as "third party autonomous vehicles." Even though such an autonomous vehicle 902 may not be included in the fleet of autonomous vehicles 902 of the service entity, the service platform can allow the autonomous vehicle(s) 902 associated with a third party to still be utilized to provide the vehicle services offered by the service entity, access the service entity's system back-ends systems, etc.

The service entity can utilize an operations computing system 909 that provides a service infrastructure for monitoring, supporting, and maintaining the autonomous vehicles as well as for coordinating and managing the autonomous vehicles to provide vehicle services. For instance, the operations computing system 909 can include a service platform.

The test article (e.g., test article 218 described above with reference to FIG. 2A) can be or include one or more of the components described above with reference to FIG. 9. For example the test article can be or include one or more of the sensor(s) 904, the vehicle computing system 912, the communication system(s) 936, the vehicle control system(s) 938, and/or human-machine interface(s) 940. The test article can be or include any other suitable component of the autonomous vehicle 902.

Additional Disclosure

The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 6 and 7 depict steps performed in a particular order for purposes of illustration and discussion, the methods of the present disclosure are not limited to the particularly illustrated order or arrangement. The various steps of the methods 600, 700 can be omitted, rearranged, combined, and/or adapted in various ways without deviating from the scope of the present disclosure.

What is claimed is:

1. A method for conducting a drop test of an article with one or more target parameters, the method comprising:
    dropping the article and a drop carriage of a drop tower from an initial height with respect to a base of the drop tower for an initial drop test, wherein the article is coupled to the drop carriage;
    detecting accelerometer data with respect to the article for an initial impact of the initial drop test between the drop carriage and the base of the drop tower;
    determining a constant energy balance curve for at least one of a complex stiffness or a total weight of the article and the drop carriage with respect to a pulse duration of the initial impact, the complex stiffness being for at least one of the drop carriage or the base of the drop tower;
    determining, based on the constant energy balance curve and a target pulse duration, at least one of a target complex stiffness or a target total weight for the article and the drop carriage;
    adjusting, based on the target complex stiffness or the target total weight, the at least one of the complex stiffness or the total weight for a subsequent drop test; and
    conducting the subsequent drop test after adjusting the at least one of the complex stiffness or the total weight for the subsequent drop test.

2. The method of claim 1, further comprising, before dropping the carriage and the article for the initial drop test, determining initial drop conditions for the initial drop test based on one or more respective predetermined adjustment range for at least one initial drop condition of the initial drop conditions, the predetermined adjustment range describing at least one of an upper bound or a lower bound for the at least one initial drop condition.

3. The method of claim 2, wherein the initial drop conditions comprise at least of one an initial drop height, an initial complex stiffness, an initial total weight of the article and the drop carriage, or a carriage weight of the drop carriage.

4. The method of claim 1, wherein adjusting, based on the target complex stiffness or the target total weight, the at least one of the complex stiffness or the total weight for the subsequent drop test comprises adjusting the total weight.

5. The method of claim 1, wherein adjusting, based on the target complex stiffness or the target total weight, the at least one of the complex stiffness or the total weight for the subsequent drop test comprises adjusting the complex stiffness.

6. The method of claim 1, wherein determining the constant energy balance curve for the at least one of the complex stiffness or the total weight of the article and the drop carriage with respect to the pulse duration of the initial impact comprises automatically determining, by one or more computing devices, the constant energy balance curve.

7. The method of claim 1, wherein determining the constant energy balance curve for the at least one of the complex stiffness or the total weight of the article and the drop carriage with respect to the pulse duration of the initial impact comprises:
    determining local peak acceleration maxima of the detected accelerometer data; and
    calculating an equivalent spring rate and an equivalent damping coefficient for the initial drop test; and
    determining constant energy balance curve based on the equivalent spring rate and the equivalent damping coefficient for the initial drop test.

8. The method of claim 1, further comprising detecting, by one or more computing devices, a user input that describes the target pulse duration, and wherein determining, based on the constant energy balance curve and the target pulse duration, the at least one of the target complex stiffness or the target total weight for the article and the drop carriage comprises automatically determining, by the one or more computing devices and in response to detecting the accelerometer data, the at least one of the target complex stiffness or the target total weight for the article and the drop carriage.

* * * * *